US007014897B2

(12) United States Patent
Pan et al.

(10) Patent No.: US 7,014,897 B2
(45) Date of Patent: Mar. 21, 2006

(54) IMAGING MEMBER HAVING A TEXTURED IMAGING SURFACE AND A PHASE CHANGE INK IMAGE PRODUCING MACHINE HAVING SAME

(75) Inventors: David H. Pan, Rochester, NY (US); James E. Williams, Penfield, NY (US); T. Edwin Freeman, Webster, NY (US); Edward B. Caruthers, Jr., Rochester, NY (US); James R. Larson, Fairport, NY (US); Frank J. Bonsignore, Rochester, NY (US); Antonio DeCrescentis, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 95 days.

(21) Appl. No.: 10/320,824

(22) Filed: Dec. 16, 2002

(65) Prior Publication Data

US 2004/0114009 A1 Jun. 17, 2004

(51) Int. Cl.
*B41J 2/175* (2006.01)
*G01D 11/00* (2006.01)

(52) U.S. Cl. .................. 428/35.7; 101/348; 101/351.6; 101/351.7; 347/88; 347/103; 428/36.9; 492/37

(58) Field of Classification Search ................ 101/348, 101/351.6, 351.7; 492/37; 428/32.18, 32.19, 428/32.2, 35.7, 36.9; 347/88, 103, 85, 99
See application file for complete search history.

(56) References Cited

U.S. PATENT DOCUMENTS

| | | | | |
|---|---|---|---|---|
| 4,636,803 | A | 1/1987 | Mikalsen | 346/1.1 |
| 4,739,339 | A | 4/1988 | DeYoung et al. | 346/1.1 |
| 5,038,157 | A | 8/1991 | Howard | 346/140 R |
| 5,372,852 | A | 12/1994 | Titterington et al. | 427/288 |
| 5,758,236 | A * | 5/1998 | Teschendorf et al. | 399/249 |
| 6,053,608 | A | 4/2000 | Ishii et al. | 347/88 |
| 6,245,421 | B1 * | 6/2001 | Aurenty et al. | 428/304.4 |
| D453,787 | S | 2/2002 | Mattern | D18/56 |
| 6,649,249 | B1 * | 11/2003 | Engle et al. | 428/205 |
| 6,899,419 | B1 * | 5/2005 | Pan et al. | 347/88 |

* cited by examiner

*Primary Examiner*—B. Hamilton Hess
(74) *Attorney, Agent, or Firm*—Tallam Nguti

(57) ABSTRACT

A liquid ink imaging member having a top outer imaging surface is provided for receiving image forming ink droplets from a printhead. The liquid ink imaging member includes (a) a substrate member; (b) at least one elastomeric layer formed over the substrate member and including the top outer imaging surface; and (c) a surface texture formed into the top outer imaging surface and comprising asperities spaced apart at most from about one-half to about one pixel spot size for providing contact angle hysteresis to pin image forming ink droplets received thereon, thereby preventing ink droplet drawback, and resulting in quality images.

28 Claims, 3 Drawing Sheets

IMAGING MEMBER HAVING A TEXTURED IMAGING SURFACE AND A PHASE CHANGE INK IMAGE PRODUCING MACHINE HAVING SAME

RELATED CASE

This application is related to U.S. application Ser. No. 10/320,828 entitled "Imaging Surface Field Reconditioning Method And Apparatus" filed on even date herewith, and having at least one common inventor.

BACKGROUND OF THE INVENTION

This invention relates generally to image producing machines, and more particularly to a liquid ink imaging member and a phase change ink image producing machine having same.

In general, phase change ink image producing machines or printers employ phase change inks that are in the solid phase at ambient temperature, but exist in the molten or melted liquid phase (and can be ejected as drops or jets) at the elevated operating temperature of the machine or printer. At such an elevated operating temperature, droplets or jets of the molten or liquid phase change ink are ejected from a printhead device of the printer onto a printing media that can be directly onto a final image receiving substrate, or indirectly onto an imaging member before transfer from it to the final image receiving media. In any case, when the ink droplets contact the surface of the printing media, they quickly solidify to create an image in the form of a predetermined pattern of solidified ink drops.

An example of such a phase change ink image producing machine or printer, and the process for producing images therewith onto image receiving sheets is disclosed in U.S. Pat. No. 5,372,852 issued Dec. 13, 1994 to Titterington et al. As disclosed therein, the phase change ink printing process includes raising the temperature of a solid form of the phase change ink to melt it and form a liquid phase change ink. It also includes applying droplets of the phase change ink in a liquid form to an intermediate transfer surface on a solid support in a pattern using a device such as an ink jet printhead. It then includes solidifying the phase change ink on the intermediate transfer surface, transferring the phase change ink from the intermediate transfer surface to the substrate, and fixing the phase change ink to the substrate.

Conventionally, the solid form of the phase change is a "stick", "block", "bar" or "pellet" as disclosed for example in U.S. Pat. No. 4,636,803 (rectangular block 24, cylindrical block 224); U.S. Pat. No. 4,739,339 (cylindrical block 22); U.S. Pat. No. 5,038,157 (hexagonal bar 12); U.S. Pat. No. 6,053,608 (tapered lock with a stepped configuration). Further examples of such solid forms are also disclosed in design patents such as U.S. Pat. No. D453,787 issued Feb. 19, 2002. In use, each such block form "stick", "block", "bar" or "pellet" is fed into a heated melting device that melts or phase changes the "stick", "block", "bar" or "pellet" directly into a print head reservoir for printing as described above.

Conventionally, phase change ink image producing machines or printers, particularly color image producing such machines or printers, are considered to be low throughput, typically producing at a rate of less than 30 prints per minute (PPM). The throughput rate (PPM) of each phase change ink image producing machine or printer employing solid phase change inks in such "stick", "block", "bar" or "pellet" forms is directly dependent on how quickly such a "stick", "block", "bar" or "pellet" form can be melted down into a liquid. The quality of the images produced also depends on such a melting rate and on the types and functions of other subsystems employed to treat and control the phase change ink as solid and liquid. Such quality also depends on the imaging member and its surface finish or texture, the printheads, and the image receiving substrates.

There is therefore a need for a relatively high-speed (greater than "XX" PPM) phase change ink image producing machine or printer that is also capable of producing relatively high quality images, particularly color images on plain paper substrates.

SUMMARY OF THE INVENTION

In accordance with the present invention, there is provided a liquid ink imaging member having a top outer imaging surface is provided for receiving image forming ink droplets from a printhead. The liquid ink imaging member includes (a) a substrate member; (b) at least one elastomeric layer formed over the substrate member and including the top outer imaging surface; and (c) a surface texture formed into the top outer imaging surface and comprising asperities spaced apart at most from about one-half to about one pixel spot size for providing contact angle hysteresis to pin image forming ink droplets received thereon, thereby preventing ink droplet drawback, and resulting in quality images.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
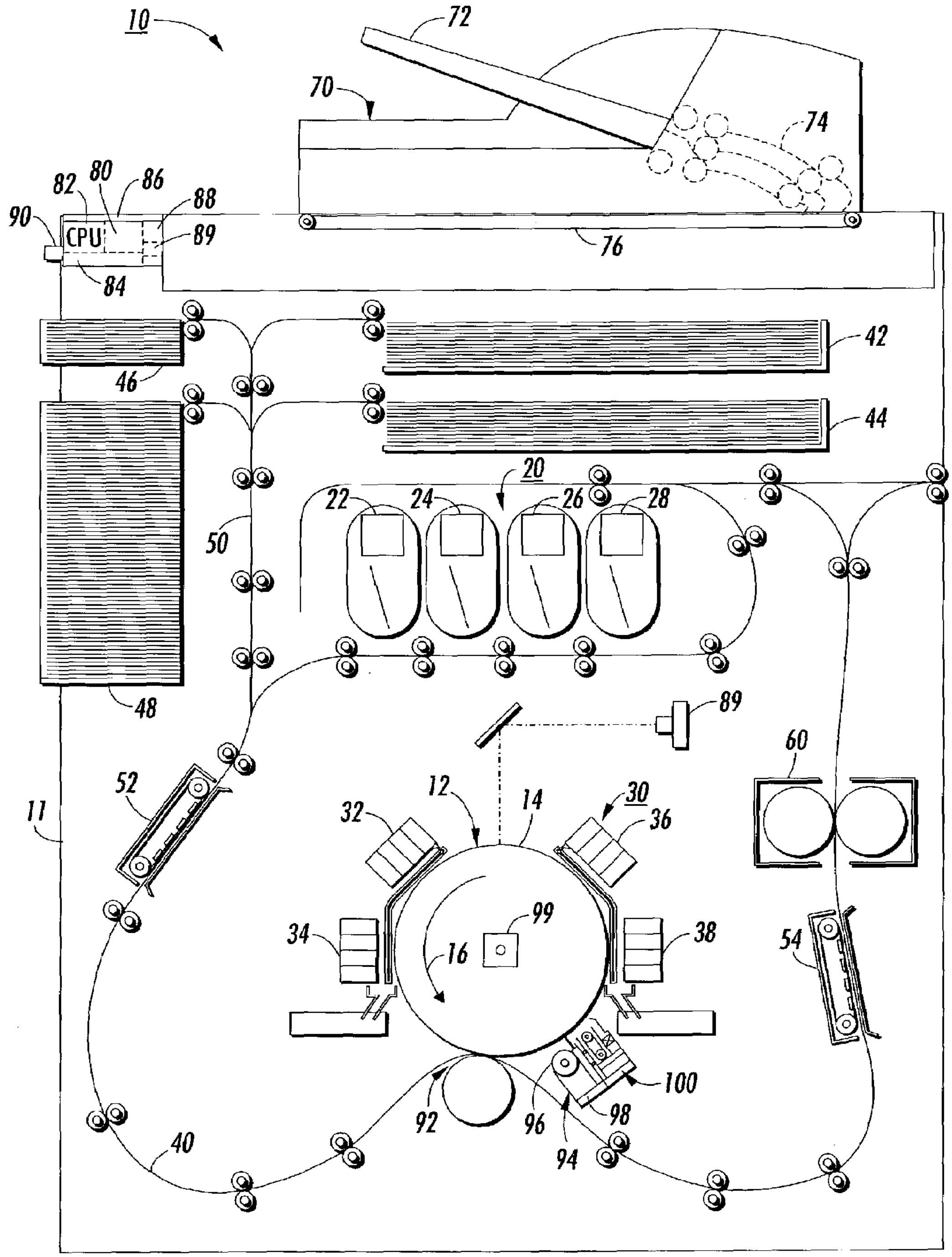
FIG. 1 is a vertical schematic of an exemplary high-speed phase change ink image producing machine including the liquid ink imaging member having a textured imaging surface in accordance with the present invention.

Referring now to FIG. 1, there is illustrated an image producing machine, such as the high-speed phase change ink image producing machine or printer 10 of the present invention. As illustrated, the machine 10 includes a frame 11 to which are mounted directly or indirectly all its operating subsystems and components, as will be described below. To start, the high-speed phase change ink image producing machine or printer 10 includes an imaging member 12 that is shown in the form of a drum, but can equally be in the form of a supported endless belt. The imaging member 12 has an imaging surface 14 that is movable in the direction 16, and on which phase change ink images are formed.

The high-speed phase change ink image producing machine or printer 10 also includes a phase change ink delivery subsystem 20 that has at least one source 22 of one color phase change ink in solid form. Since the phase change ink image producing machine or printer 10 is a multicolor image producing machine, the ink delivery system 20 includes four (4) sources 22, 24, 26, 28, representing four (4) different colors CYMK (cyan, yellow, magenta, black) of phase change inks. The phase change ink delivery system also includes a melting and control apparatus (not shown in FIG. 1) for melting or phase changing the solid form of the phase change ink into a liquid form, and for then supplying the liquid form to a printhead system 30 including at least one printhead assembly 32. Since the phase change ink image producing machine or printer 10 is a high-speed, or high throughput, multicolor image producing machine, the printhead system includes four (4) separate printhead assemblies 32, 34, 36 and 38 as shown.

As further shown, the phase change ink image producing machine or printer 10 includes a substrate supply and handling system 40. The substrate supply and handling system 40 for example may include substrate supply sources 42, 44, 46, 48, of which supply source 48 for example is a high capacity paper supply or feeder for storing and supplying image receiving substrates in the form of cut sheets for example. The substrate supply and handling system 40 in any case includes a substrate handling and treatment system 50 that has a substrate pre-heater 52, substrate and image heater 54, and a fusing device 60. The phase change ink image producing machine or printer 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes sensor input and control means 88 as well as a pixel placement and control means 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the machine's printing operations.

In operation, image data for an image to be produced is sent to the controller 80 from either the scanning system 76 or via the online or work station connection 90 for processing and output to the printhead assemblies 32, 34, 36, 38. Additionally, the controller determines and/or accepts related subsystem and component controls, for example from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by anyone of the sources 42, 44, 46, 48 and handled by means 50 in timed registration with image formation on the surface 14. Finally, the image is transferred within the transfer nip 92, from the surface 14 onto the receiving substrate for subsequent fusing at fusing device 60.

Still referring now to FIG. 1, in order to maintain the quality of images produces as such, the image producing machine 10 includes a maintenance assembly 94 that employs imaging surface field reconditioning method and apparatus 100 of the present invention. The maintenance assembly 94 includes an oiling roller 96 that is movable by moving means 98 into and out of oiling engagement with the imaging surface 14 of the imaging drum 12.

Figure 2:
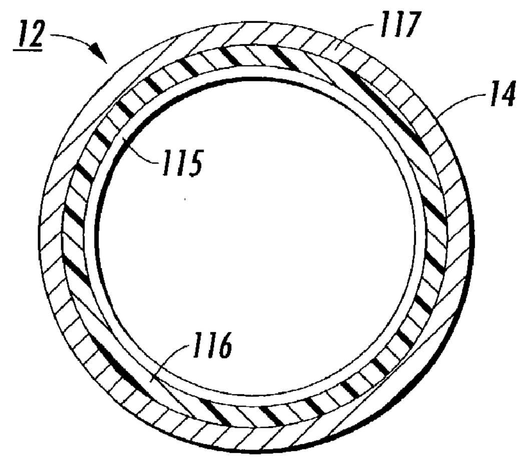
FIG. 2 is a cross-sectional view of the imaging member of the machine of FIG. 1.

As illustrated in FIG. 2, the imaging member 12 comprises a substrate or core 115 made for example of aluminum, over which is at least one elastomeric coating 117. In one embodiment, the imaging member 12 has only the top surface coating 117 over the substrate 115, and on which is formed the surface texture 121 in accordance with the present invention. The top surface layer 117 for example comprises an elastomer, such as a fluoroelastomer. For example, the fluoroelastomers may comprise copolymers and terpolymers of vinylidenefluoride, hexafluoropropylene and tetrafluoroethylene, which are known commercially under various designations as VITON A®, VITON B®, VITON E®, VITON F®, and the like which are all Trademarks of E. I. DuPont de Nemours, Inc. In another embodiment, the imaging member 12 has an intermediate elastomeric layer 116 formed between the substrate 115 and the top surface coating 117.

Still referring now to FIG. 1, the imaging member or drum 12 is movable for example by means 99 in the direction 16. As further illustrated, the imaging surface 14 may have formed therein the marking material flow control or flow restriction pattern or texture 121 for preventing liquid ink marking material for example from flowing backwards given a forward direction of movement of the surface 14. In the case of a phase change ink image producing machine that includes the imaging member (offset printing drum 12), the surface texture 121 of the offset printing drum is an important consideration for enabling continuous quality printing. This is because the surface texture 121 acts to pin individual liquid ink droplets to prevent what is referred to in the art as "ink drawback".

As discussed above, in operation, release oil is applied to the surface 14 by oiling roller 96 for example in order to facilitate image release therefrom. Then liquid or molten ink images are formed on the surface 14, pinned in place by the surface texture 121, and subsequently transferred under pressure within transfer nip or transfer station 92 onto an image receiving substrate. During the imaging process as such, an original surface texture 121, particularly of compliant surface 14, gradually wears away thereby causing the surface 14 to eventually become smoother and smoother, and if not reconditioned, polished. This loss of surface texture 121 inhibits droplet pinning and leads to marking material drawback. This reduces image quality and manifests itself as areas void of ink or as mottled areas in the final image.

Referring now to FIGS. 1–4, the liquid ink imaging member 12 has the top outer imaging surface 14 for receiving image forming ink droplets from the printhead assemblies 32, 34, 36, 38. As further shown, the liquid ink imaging member 12 includes (a) the substrate or core member 115 made for example of aluminum, (b) at least one elastomeric layer 117 that is made of a fluoroelastomer and is formed over the substrate member 115 and that includes the top outer imaging surface 14. The substrate member may comprise a cylindrical drum core as shown or it could be the backing for a belt imaging member. In any case the imaging member 12 may also include the intermediate elastomeric layer 116 formed between the substrate member 115 and the at least one elastomeric layer 117 that includes the top outer imaging surface 14.

Figure 3:
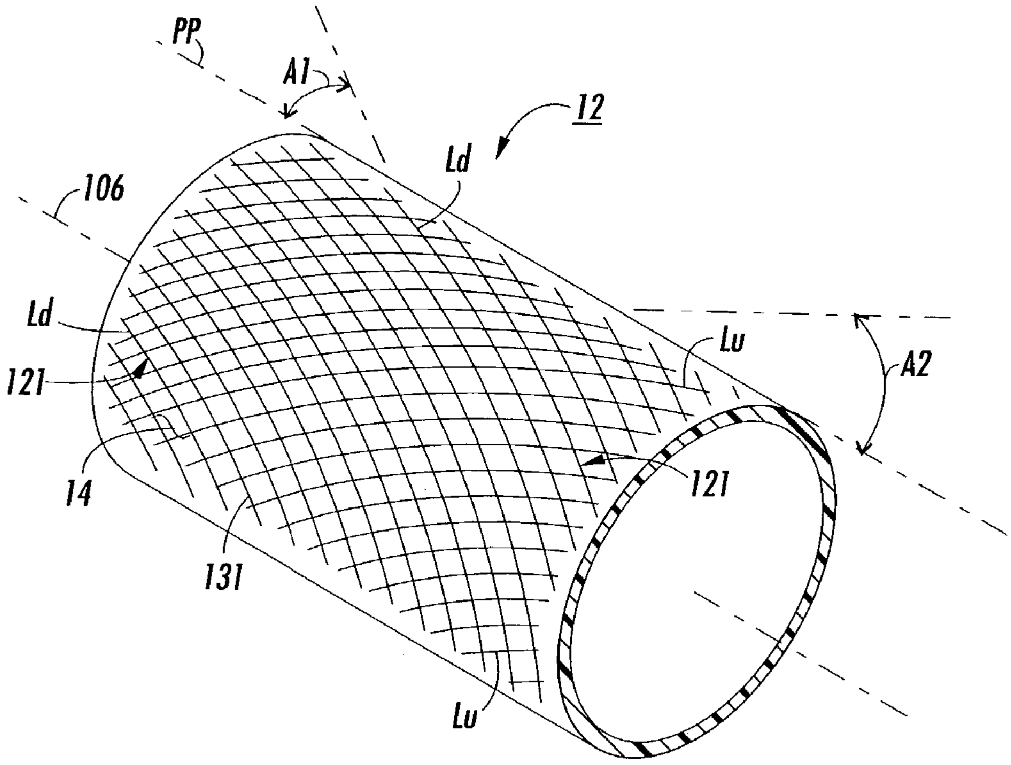
FIG. 3 is a schematic illustration of the surface texture of the imaging surface of the imaging member of FIG. 2.
Figure 4:
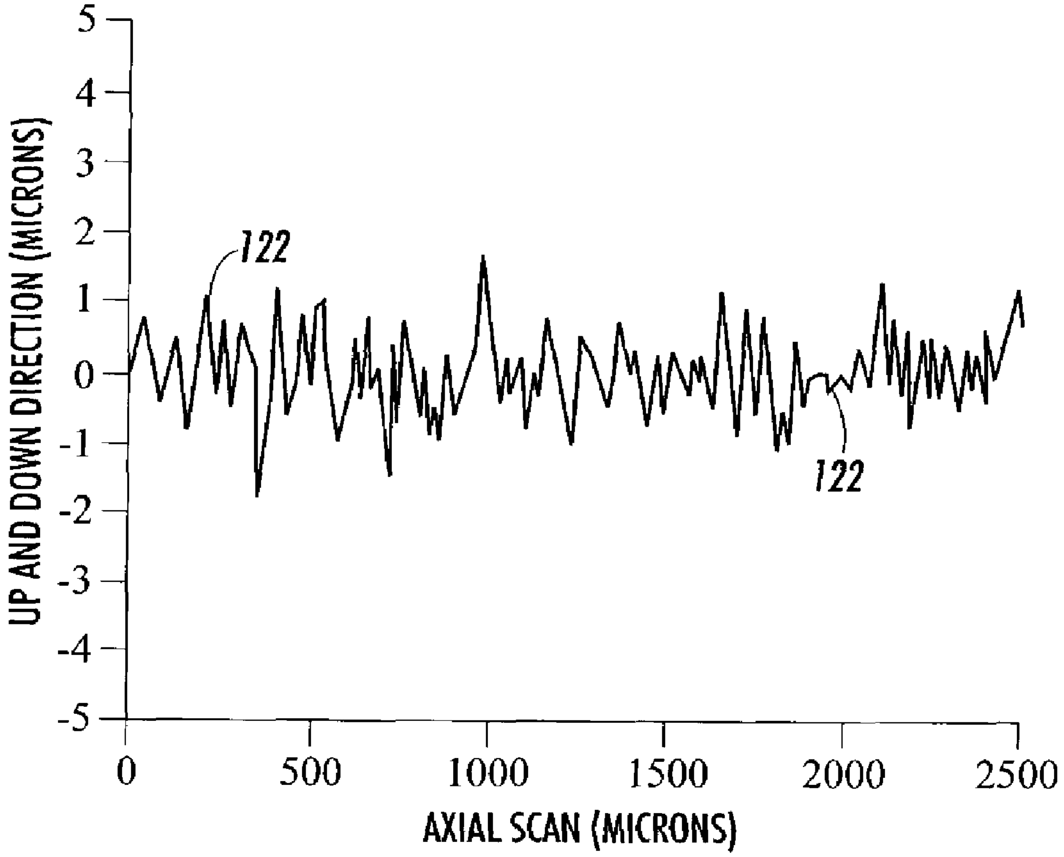
FIG. 4 is a graphical illustration of the surface roughness of the texture of the imaging surface of the liquid imaging member of the present invention.

The liquid ink imaging member 12 also includes (c) the surface texture 121 of the present invention. As illustrated in FIGS. 3–4, the surface texture 121 is formed on the top outer imaging surface 14, and into the at least one elastomeric layer 117. The surface texture 121 is comprised of asperities 122 or tiny projections on or indentations into the surface 14. The asperities 122 as such should be spaced apart at most from about one-half to about one pixel spot size. Such spacing makes the surface suitable for providing contact angle hysteresis, that is, a retardation (due to the contact angle) in the flow of the phase change ink droplets when the temperature of the surface of such ink droplets changes causing coalescence. Such contact angle hysteresis effectively pins each such ink droplet within a one-half to one pixel size distance from where it is received on the surface 14. This prevents ink droplet drawback, and results in quality images.

In one embodiment as illustrated in FIG. 3, the surface texture 121 comprises a cross-hatched pattern 131. The cross-hatched pattern 131 is formed for example of a first set of lines or marks Ld that as shown are declining left to right, and a second set of lines or marks Lu that similarly are inclined left to right. The first and second sets of lines Ld, Lu each have an angle A1, A2 that lie within a range of from about 30 degrees to about 75 degrees with a plane PP parallel to a longitudinal axis 106 of the imaging surface 14. In another embodiment, the angles A1, A2 may each be 45 degrees. In any case the cross-hatched pattern comprises asperities 122 at most one-tenth to one quarter pixel size deep. It may alternatively comprise asperities 122 that are spaced apart less than about one-half pixel size location. As further shown in FIG. 4, the surface texture 121 can also be described in terms of surface roughness (Ra). As shown, the surface texture 121 has a roughness Ra within a range of from about 0.05 micron to about 1 micron, and preferably from about 0.1 micron to about 0.5 micron, and most preferably from about 0.2 micron to about 0.4 micron.

In general for the purpose of preventing "image drawback", that is the undesirable movement from their intended pixel location (drawback), and coalescence of image forming ink droplets on the surface 14, more drum texture 121 is better. A wide range of surface roughness comprising fairly large asperities spaced about ½ to 1 pixel apart and about 1/10 to ¼ pixel projections to smaller asperities spaced with a higher frequency of less than ½ pixel. This results in non-uniform surface energy and significant "contact angle hysteresis." It has been found that smooth, that is, low energy surface energy is a factor contributing to image drawback by allowing ink droplets the "energy" and "time" to move (drawback) and coalesce on the surface of the drum. Misplaced ink drops tend to amplify this ink drawback problem. However, in accordance with the present invention, texture 121 on the surface 14 results in a rough, non-uniform energy surface, and little or no drawback problems.

As can be seen, there has been provided a liquid ink imaging member having a top outer imaging surface for receiving image forming ink droplets from a printhead. The liquid ink imaging member includes (a) a substrate member; (b) at least one elastomeric layer formed over the substrate member and including the top outer imaging surface; and (c) a surface texture formed into the top outer imaging surface and comprising asperities spaced apart at most from about one-half to about one pixel spot size for providing contact angle hysteresis to pin image forming ink droplets received thereon, thereby preventing ink droplet drawback, and resulting in quality images.

While the embodiment of the present invention disclosed herein is preferred, it will be appreciated from this teaching that various alternative, modifications, variations or improvements therein may be made by those skilled in the art, which are intended to be encompassed by the following claims:

What is being claimed is:

1. An offset printing drum for use in a phase change ink printing machine to receive ink droplets from a printhead forming an image, and to transfer such image onto an image receiving substrate, the offset the offset printing drum comprising:

(a) a substrate member;

(b) at least one elastomeric layer formed over said substrate member and including a top outer imaging surface for receiving image forming ink droplets from the printhead; and (c) a surface texture formed into said top outer imaging surface and comprising a cross-hatched pattern of lines, said lines being spaced apart at most one-half to one pixel spot size for providing contact angle hysteresis to pin image forming ink droplets received thereon, thereby preventing ink droplet drawback, and resulting in quality images.

2. The offset printing drum of claim 1, wherein said surface texture comprises a surface roughness Ra within a range of from about 0.05 micron to about 1 micron.

3. The offset printing drum of claim 1, wherein said imaging member includes an intermediate elastomeric layer formed between said substrate member and said at least one elastomeric layer.

4. The offset printing drum of claim 1, wherein said surface texture formed into said top outer imaging surface comprises asperities spaced apart less than one-half pixel spot size.

5. The offset printing drum of claim 1, wherein said at least one elastomeric layer is made of a fluoroelastomer.

6. The offset printing drum of claim 1, wherein said substrate member is comprised of aluminum.

7. The offset printing drum of claim 1, wherein said cross-hatched pattern comprises asperities one-eight to one quarter pixel size deep.

8. The offset printing drum of claim 1, wherein said lines each have an angle within a range of 30 degrees to 60 degrees with a plane parallel to a longitudinal axis of the imaging surface.

9. The offset printing drum of claim 8 wherein said lines each have an angle within a range of 30 degrees to 60 degrees with a plane parallel to a longitudinal axis of the imaging surface.

10. A phase change ink image producing machine comprising:

(a) a control subsystem for controlling operation of all subsystems and components of the image producing machine;

(b) melting apparatus for melting solid phase change ink into melted molten liquid ink;

(c) a printhead system located for receiving said melted molten liquid ink, said printhead system being connected to said control subsystem for ejecting droplets of melted molten liquid ink onto an imaging member to form an image; and (d) a movable imaging member having a top outer imaging surface for receiving said droplets of melted molten liquid ink from said printhead system, said imaging member comprising:

(i) a substrate member;

(ii) at least one elastomeric layer formed over said substrate member and including said top outer imaging surface; and (iii) a surface texture formed into said top outer imaging surface and comprising asperities spaced apart at most one-half to one pixel spot for providing contact angle hysteresis to pin image forming ink droplets received thereon, thereby preventing ink droplet drawback, and resulting in quality images.

11. The phase change ink image producing machine of claim 10, wherein said surface texture comprises a cross-hatched pattern.

12. The phase change ink image producing machine of claim 10, wherein said surface texture comprises a surface roughness Ra within a range of from about 0.05 micron to about 1 micron.

13. The phase change ink image producing machine of claim 10, wherein said imaging member includes an intermediate elastomeric layer formed between said substrate member and said at least one elastomeric layer.

14. The phase change ink image producing machine of claim 10, wherein said surface texture formed into said top outer imaging surface comprises asperities spaced apart less than one-half pixel spot.

15. The phase change ink image producing machine of claim 10, wherein said at least one elastomeric layer is made of a fluoroelastomer.

16. The phase change ink image producing machine of claim 10, wherein said substrate member is comprised of aluminum.

17. The image producing machine of claim 11, wherein said cross-hatched pattern comprises asperities one-eighth to one quarter size of pixel deep.

18. The phase change ink image producing machine of claim 11, wherein said cross-hatched pattern is comprised of crossing lines each having an angle within a range of 30 degrees to 60 degrees with a plane parallel to a longitudinal axis of the imaging surface.

19. The phase change ink image producing machine of claim 18, wherein said cross-hatched pattern is comprised of crossing lines each having an angle of 45 degrees with said plane parallel to a longitudinal axis of the imaging surface.

20. A phase change ink image producing machine comprising:

(a) a control subsystem for controlling operation of all subsystems and components of the image producing machine;

(b) melting apparatus for melting solid phase change ink into melted molten liquid ink;

(c) a printhead system located for receiving said melted molten liquid ink, said printhead system being connected to said control subsystem for ejecting droplets of melted molten liquid ink onto an imaging member to form an image; and (d) a movable offset printing drum having a top outer imaging surface for receiving said droplets of melted molten liquid ink from said printhead system, said offset printing drum comprising:

(i) a substrate member;

(ii) at least one elastomeric layer formed over said substrate member and including said top outer imaging surface; and (iii) a surface texture formed into said top outer imaging surface and comprising a cross-hatched pattern of lines spaced apart at most one-half to one pixel spot for providing contact angle hysteresis to pin image forming ink droplets received thereon, thereby preventing ink droplet drawback, and resulting in quality images.

21. The phase change ink image producing machine of claim 20, wherein said surface texture comprises a surface roughness Ra within a range of from about 0.05 micron to about 1 micron.

22. The phase change ink image producing machine of claim 20, wherein said offset printing drum includes an intermediate elastomeric layer formed between said substrate member and said at least one elastomeric layer.

23. The phase change ink image producing machine of claim 20, wherein said surface texture formed into said top outer imaging surface comprises a cross-hatched pattern of lines spaced apart less than one-half pixel spot.

24. The phase change ink image producing machine of claim 20, wherein said at least one elastomeric layer is made of a fluoroelastomer.

25. The phase change ink image producing machine of claim 20, wherein said substrate member is comprised of aluminum.

26. The image producing machine of claim 20, wherein lines of said cross-hatched pattern of lines are one-eighth to one quarter size of a pixel deep.

27. The phase change ink image producing machine of claim 20, wherein said cross-hatched pattern of lines is comprised of crossing lines each having an angle within a range of 30 degrees to 60 degrees with a plane parallel to a longitudinal axis of the imaging surface.

28. The phase change ink image producing machine of claim 27, wherein said cross-hatched pattern of lines is comprised of crossing lines each having an angle of 45 degrees with said plane parallel to a longitudinal axis of the imaging surface.

* * * * *